(12) United States Patent
Liu

(10) Patent No.: US 6,516,525 B2
(45) Date of Patent: Feb. 11, 2003

(54) HANDSAW

(76) Inventor: Chin-Pao Liu, No. 60, Hsien-Jen 1st St., Ta-Li City, Taichung Hsien (TW)

( * ) Notice: Subject to any disclaimer, the term of this patent is extended or adjusted under 35 U.S.C. 154(b) by 0 days.

(21) Appl. No.: 09/898,691

(22) Filed: Jul. 2, 2001

(65) Prior Publication Data

US 2003/0000092 A1 Jan. 2, 2003

(51) Int. Cl.[7] .................................................. B26B 1/04

(52) U.S. Cl. ........................ 30/519; 30/166.3; 30/331; 30/517

(58) Field of Search .............................. 30/166.3, 329, 30/330, 331, 340, 342, 517, 519

(56) References Cited

U.S. PATENT DOCUMENTS

| | | | | |
|---|---|---|---|---|
| 2,621,689 A | * | 12/1952 | Fordon | 30/519 |
| 2,747,631 A | * | 5/1956 | Behlefeldt | 30/519 |
| 2,762,407 A | * | 9/1956 | McCord, Jr. | 30/519 |
| 5,722,168 A | * | 3/1998 | Huang | 30/517 |
| 5,930,902 A | * | 8/1999 | Hsu | 30/166.3 |

* cited by examiner

Primary Examiner—Hwei-Slu Payer
(74) Attorney, Agent, or Firm—Kolisch Hartwell, P.C.

(57) ABSTRACT

A handsaw includes a handle, a saw blade pivotally attached to the handle and a position device movably mounted in the handle to selectively hold the saw blade in place. The handle and the saw blade form an angle that is adjustable because the saw blade is pivotally attached to the handle and selectively positioned by the position device.

7 Claims, 7 Drawing Sheets

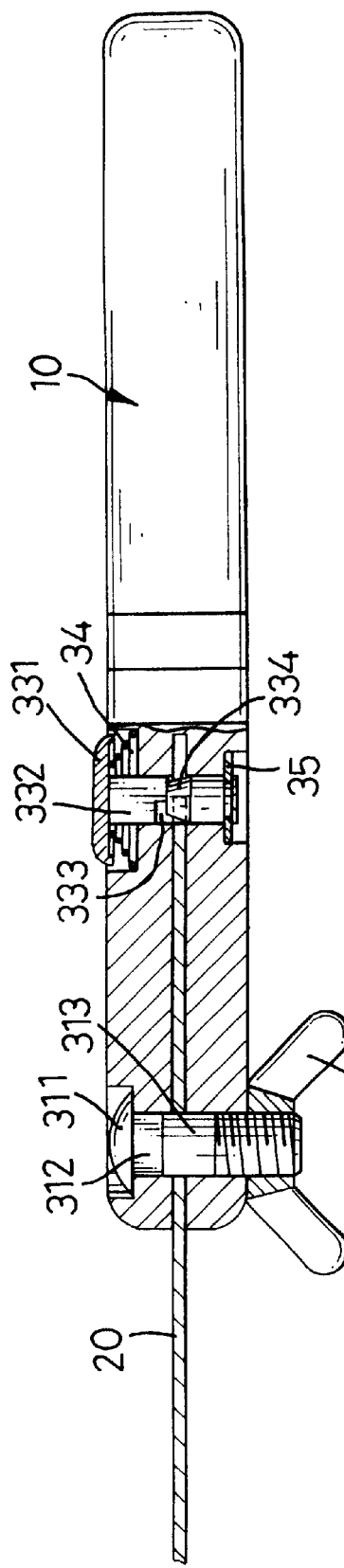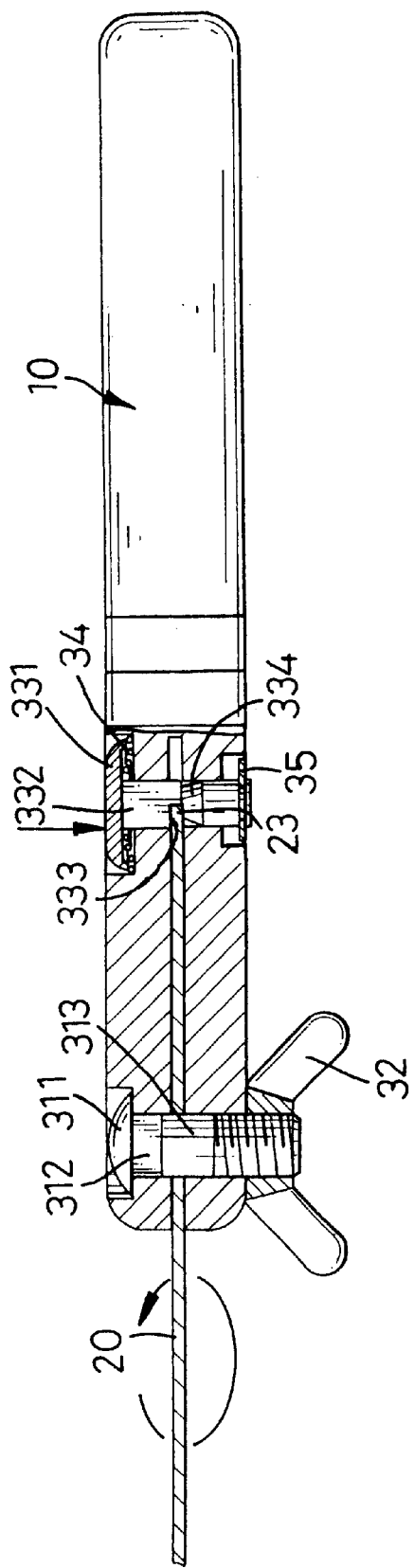

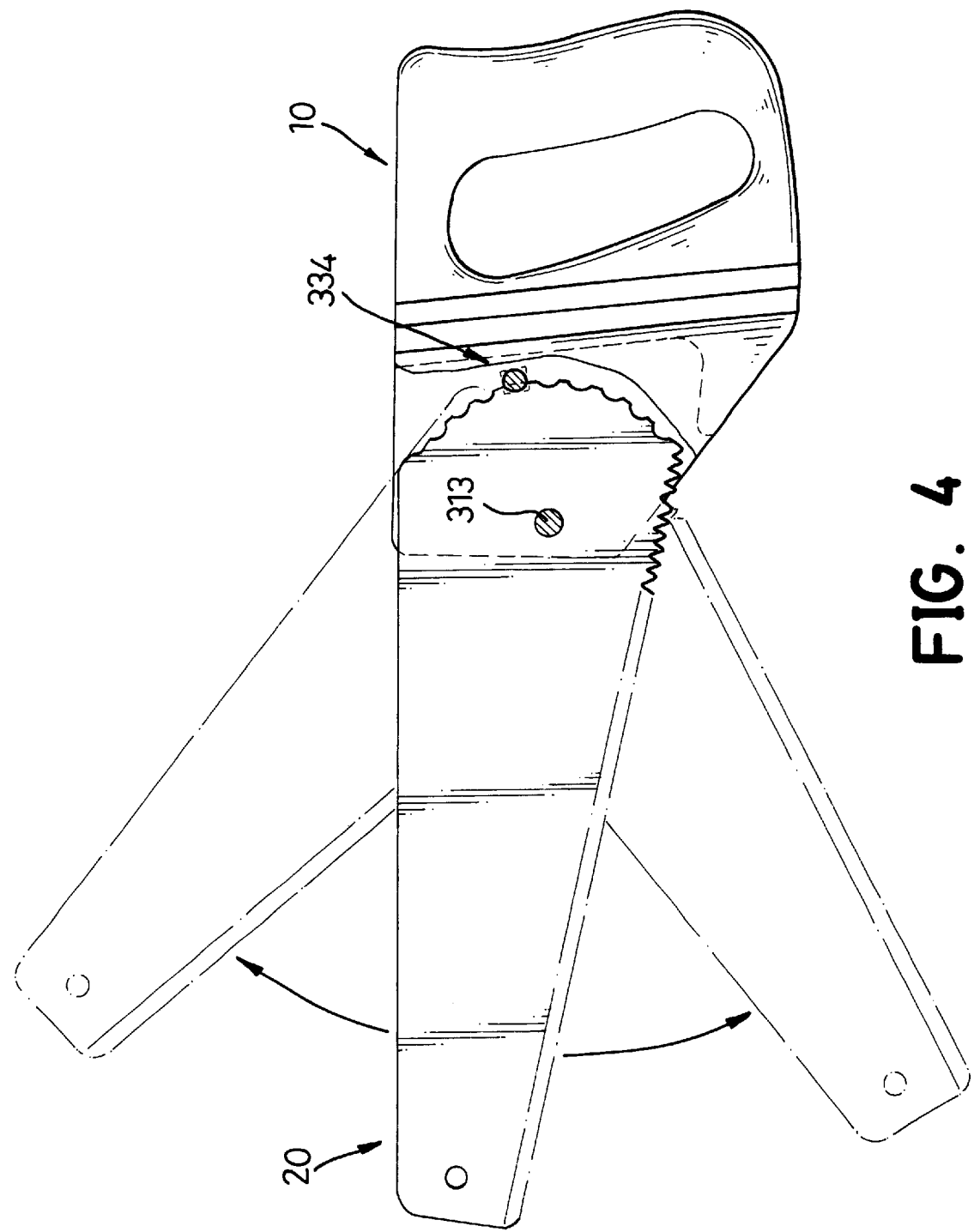

HANDSAW

BACKGROUND OF THE INVENTION

1. Field of the Invention

The present invention relates to a handsaw, and more particularly to a handsaw that comprises a handle and a saw blade attached at an angle and the angle is adjustable.

2. Description of Related Art

With reference to FIG. 7, a conventional handsaw in accordance with the prior is foldable and comprises a handle (50), a saw blade (51) and a retaining device (52). The saw blade (51) is pivotally mounted in one end of the handle (50). The retaining device (52) mounted in the handle to hold the saw blade (51) in place. The handle (50) has a slit (501) longitudinally defined to partially receive the saw blade (51) when the saw blade (51) is in a stored position. The pivot end of the saw blade (51) is curved and the center of the curved end is used as a pivot point. Two detents (511) are defined at diametrically positions in the edge of the curved pivot end of the saw blade (51) and selectively engage the retaining device (52) when the handsaw is open or a closed. The handle (50) and the saw blade (51) form an angle that is either 180 degrees or 0 degrees whatever the handsaw is in an operational position or a stored position because the two detents (511) are defined diametrically opposite to each other in the saw blade (51). In addition to the capability of the saw blade (51) to be received in the handle (50), the handsaw is the same as an ordinary handsaw.

With reference to FIG. 8, another conventional handsaw comprises a handle (60) and a saw blade (61) pivotally attached to the handle (60). The handle (60) includes a positioning knob (62) mounted on the handle (60) to hold the saw blade (61) in place by means of a screw device. The pivot end of the saw blade (61) is curved, and the center of the curved pivot end is used as a pivot point. Multiple indents (611) are defined in and equally divide the pivot end of the saw blade (61). The handle (60) includes multiple protrusions (601), each vertically extending to engage with a corresponding one of the indents (611) in the saw blade (61) to prevent the saw blade (61) from pivotally moving on the handle (60). The positioning knob (62) and the saw blade (61) must be detached from the handle (60) when the angle between the handle (60) and the saw blade (61) needs to be adjusted. To adjust the angle between the handle (60) and the saw blade (61) is inconvenient.

The present invention has arisen to mitigate and/or obviate the disadvantages of the conventional handsaw.

SUMMARY OF THE INVENTION

The main objective of the present invention is to provide an improved handsaw with an adjustable saw blade relative to the handle. To achieve the objective, the handsaw in accordance with the present invention comprises a handle, a saw blade pivotally mounted on the handle and a position device movably mounted in the handle to selectively hold the saw blade in place. The handle and the saw blade form an angle that is adjustable because the saw blade is pivotally mounted in the handle and selectively positioned by the position device.

Further benefits and advantages of the present invention will become apparent after a careful reading of the detailed description with appropriate reference to the accompanying drawings.

BRIEF DESCRIPTION OF THE DRAWINGS

FIG. 2 is a bottom plan view in partial section of the handsaw in FIG. 1 when the saw blade is locked;

FIG. 3 is a bottom plan view in partial section of the handsaw in FIG. 1 when the saw blade is free;

FIG. 4 is an operational side plan view of the handsaw in FIG. 1;

DETAILED DESCRIPTION OF THE INVENTION

Figure 1:
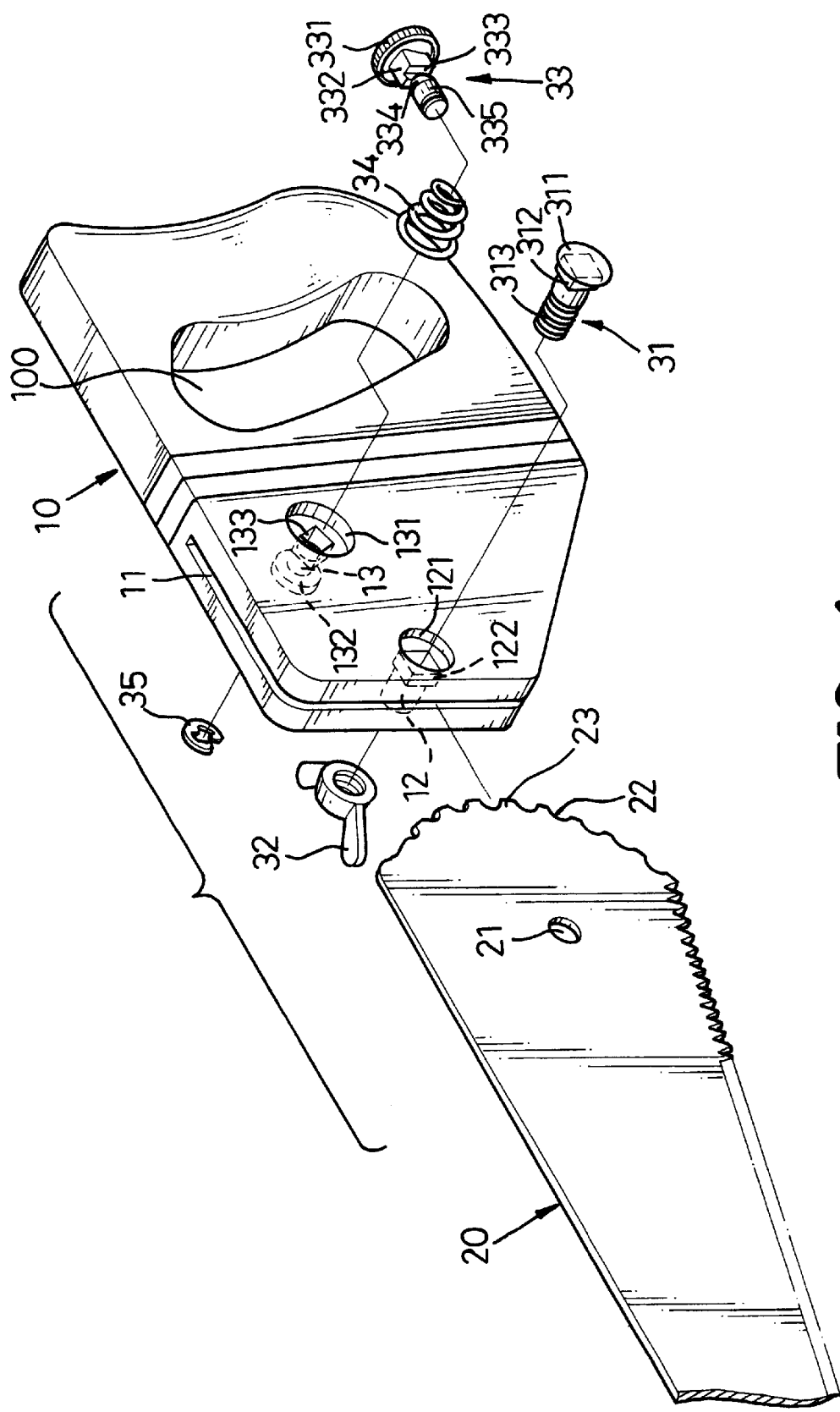
FIG. 1 is an exploded perspective view of a handsaw in accordance with the present invention.

With reference to the drawings and initially to FIGS. 1 and 2, a handsaw in accordance with the present invention comprises a handle (10), a saw blade (20) and a position device. The saw blade (20) is pivotally mounted in the handle (10), and the position device is mounted in the handle (10) to hold the saw blade (20) in place.

The handle (10) includes a left side, a right side parallel to the left side, a front portion having a slit (11) longitudinally defined in the handle (10) and a rear portion having an opening (100) transversely extending through the handle (10). A pivot hole (12) is transversely defined through the front portion of the handle (10) and communicates with the slit (11). A positioning hole (13) is transversely defined in the front portion of the handle (10) and communicates with the slit (11) between the pivot hole (12) and the opening (100).

A first enlarged countersunk hole (121) is defined in the left side of the handle (10) coaxially aligned with the pivot hole (12), and a first polygonal recess (122) is defined between the slit (11) and the first enlarged countersunk hole (121). The first enlarged countersunk hole (121) and the first polygonal recess (122) communicate with the pivot hole (12). The area of the enlarged countersunk hole (121) is greater than that of the first polygonal recess (122). A second enlarged countersunk hole (131) and a third enlarged countersunk hole (132) coaxially aligned are respectively defined in the left side of the handle (10) and the right side of the handle (10). The second enlarged countersunk hole (131) and the third enlarged countersunk hole (132) are aligned and communicate with the positioning hole (13) in the front portion of the handle (10). A second polygonal recess (133) is defined in the front portion of the handle (10) between the second enlarged countersunk hole (131) and the slit (11) in the front portion of the handle (10).

The saw blade (20) has a front end and a rear end. The rear end is received in the slit (11) of the handle (10), and a through hole (21) is defined in the rear end to correspond to the pivot hole (12) in the handle (10). The rear end of the saw blade (20) is a constant radius curve and the through hole (21) is at the center of curvature of the rear end of the saw blade (20). Multiple semicircular indents (22) are defined in the rear end of the saw blade (20) to equally divide the rear end of the saw blade (20), and a protrusion (23) is formed between adjacent indents (22).

The position device includes a pivot pin (31) and a locking pin (33). The pivot pin (31) is mounted in the pivot hole (12) in the handle (10) and through the through hole

(21) in the saw blade (20) to pivotally attach the saw blade (20) to the handle (10). The locking pin (33) is movably mounted in the positioning hole (13) in the handle (10) to selectively hold the angle of the saw blade (20) with respect to the handle (10).

The pivot pin (31) includes a head (311) received in the first enlarged countersunk hole (121) in the left side of the handle (10). A block (312) extends from one side of the head (311) and received in the first polygonal recess (122). The block (312) is polygonal and engages the first polygonal recess (122) to prevent the pivot pin (31) from rotating in the pivot hole (12). A rod (313) axially extends through the handle (10) from the block (312). The rod (313) has a free end that is threaded, and a nut (32) is screwed onto the threaded end of the rod (313) to prevent the pivot pin (31) from detaching from the handle (10).

The locking pin (33) includes a button (331) received in the second enlarged countersunk hole (131) in the handle (10), and a position block (332) extends from the button (331) to be received in the second polygonal recess (133). The position block (332) is polygonal and engages the second polygonal recess (133) to prevent the locking pin (33) from rotating in the positioning hole (13). The position block (332) has a channel (333) defined to face the through hole (21) in the saw blade (20). The protrusions (23) on the rear end of the saw blade (20) pass through the channel (333) when the angle of the saw blade (20) with respect to the handle (10) is adjusted. A position pin (335) axially extends from the position block (332) opposite to the button (331). The position pin (335) has a first end connecting to the position block (332) and a second extending into the third enlarged countersunk hole (132). A tapered guiding portion (334) is defined in the first end of the position pin (335) and is tapered to the position block (332). The position pin (33) extends through the positioning hole (13) of the handle (10) after penetrating a spring (34). A locking element (35) is attached to the second end of the position pin (335) and received in the third enlarged countersunk hole (132) to prevent the locking pin (33) from detaching from the handle (10) due to the restitution force of the spring (34). In the preferred embodiment of the present invention, the locking element (35) is an E-shaped ring and the spring (34) is a conical spring to allow the spring (34) to be compressed to the width of the wire forming the spring.

To assemble the present invention, the locking pin (33) extends through the spring (34) and is inserted through the positioning hole (13). The channel (333) in the position block (332) of the locking pin (33) is set to face the pivot hole (12) and the locking element (35) is attached to the free end of the locking pin (33) to prevent the locking pin (33) from detaching from the handle (10). The rear end of the saw blade (20) with the indents (22) and protrusions (23) is inserted into the slit (11), and one of the indents (22) is set to match with the position pin (335) of the locking pin (33). The through hole (21) in the saw blade (20) is aligned with the pivot hole (12) in the handle (10). The pivot pin (31) is inserted through the pivot hole (12) in the handle (10) and the through hole (21) in the saw blade (20), and a nut (32) is screwed onto the free end of the pivot pin (31) to hold the pivot pin (31) in place. The saw blade (20) is hold in place by an indent (22) in the rear of the saw blade (20) engaging with the position pin (335) of the locking pin (33).

To adjust the angle between the handle (10) and the saw blade (20), the button (331) on the locking pin (33) is pushed to press the spring (34) and move the locking pin (33) to make the channel (333) in the position block (332) align with and release the indent (22) in the rear end of the saw blade (20). The protrusion (23) in the rear end of the saw blade (20) can pass through the channel (333) in the position block (332) to adjust the angle between the saw blade (20) and the handle (10). The saw blade (20) will locked when the button (331) is released, and the saw blade (20) is adjusted to a suitable angle.

Figure 5:
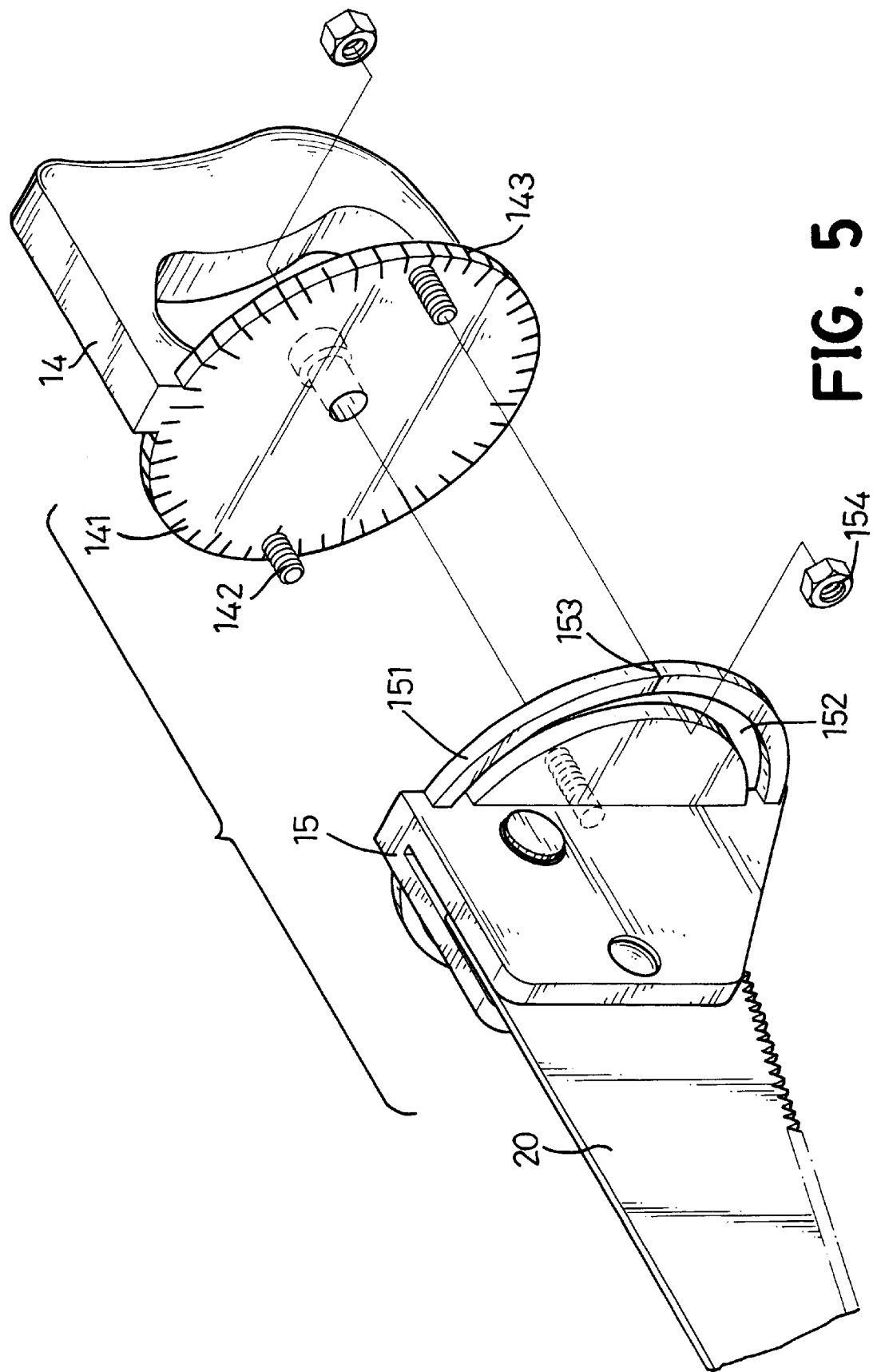
FIG. 5 is a partially exploded perspective view of another embodiment of the handsaw in accordance with the present invention.
Figure 6:
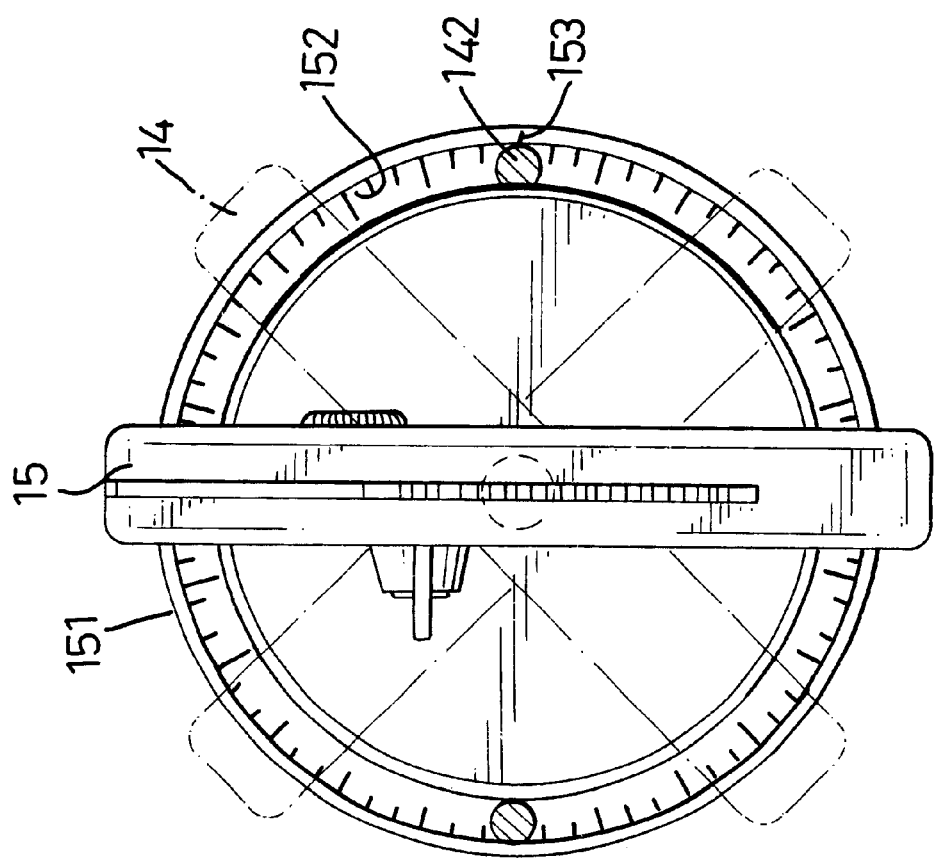
FIG. 6 is an operational front plan view of the handsaw in FIG. 5.
Figure 7:
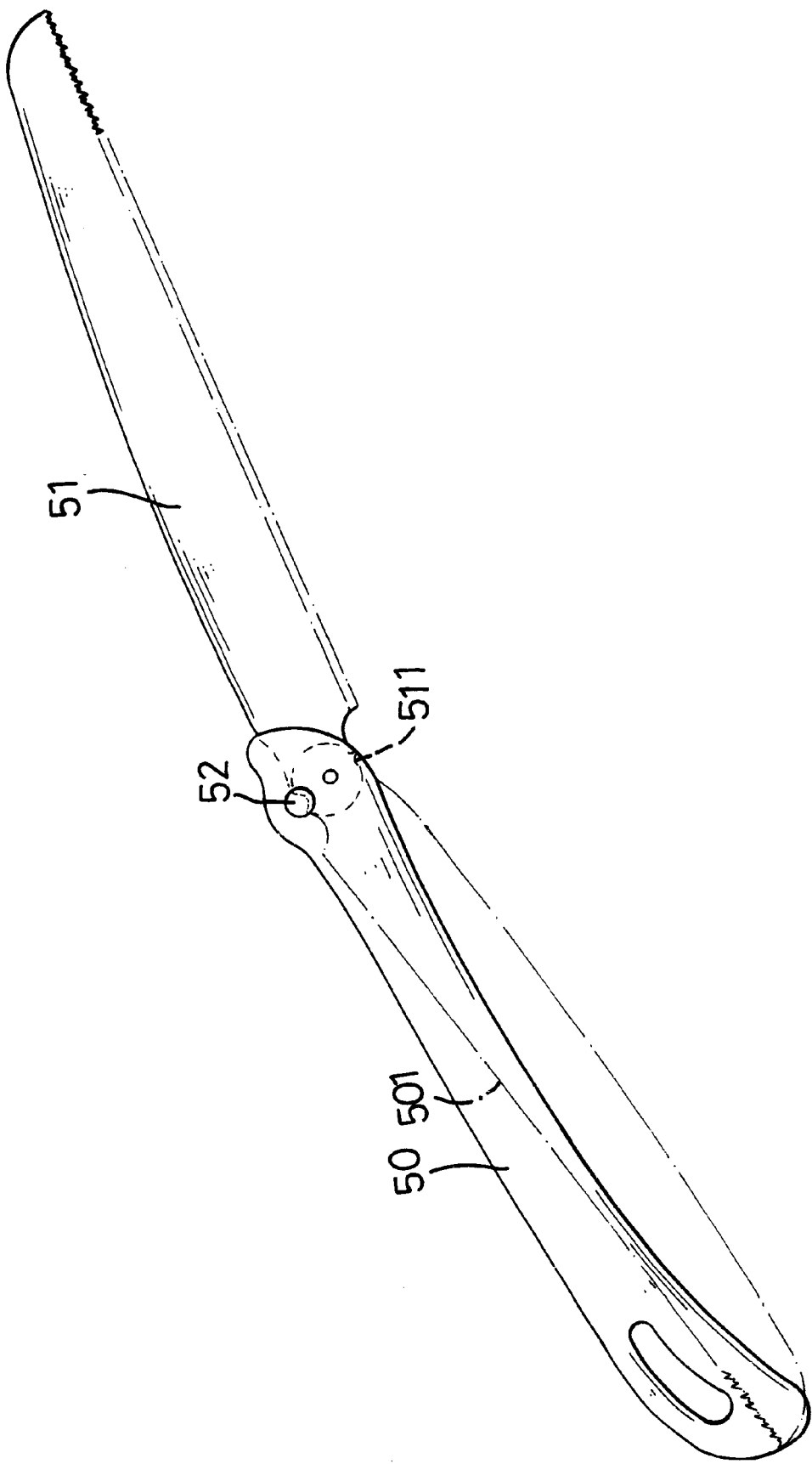
FIG. 7 is an operational side plan view of a conventional handsaw in accordance the prior art.
Figure 8:
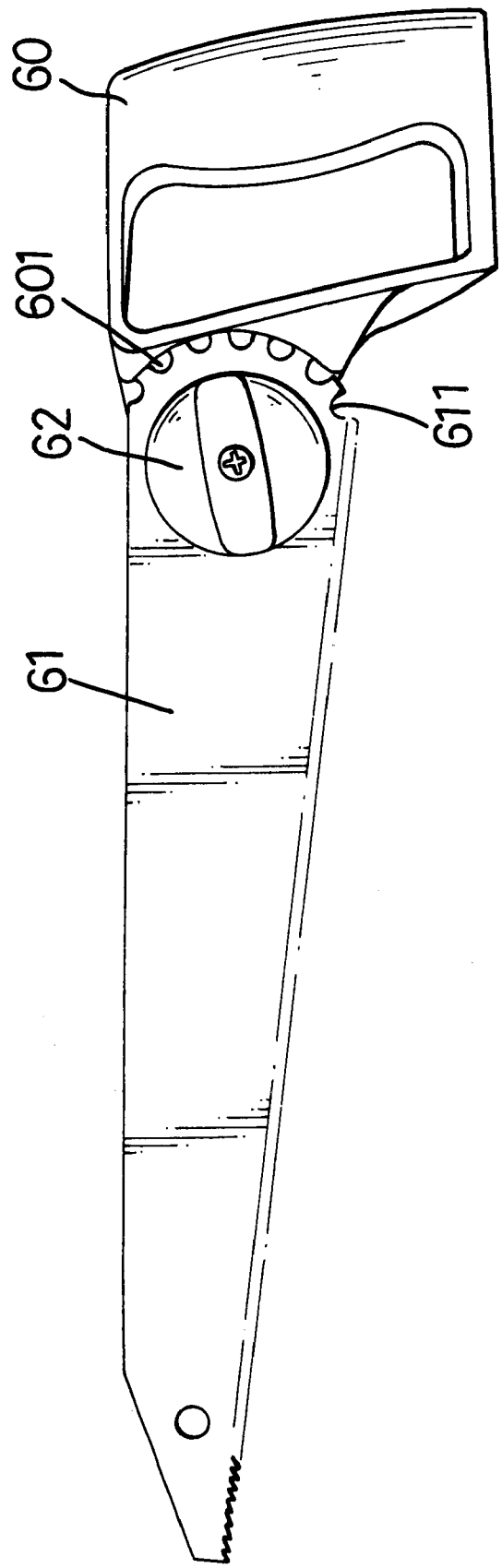
FIG. 8 is a side plan view of another conventional handsaw in accordance with the prior art.

With reference to the FIGS. 5 and 6, a second embodiment of the handsaw in accordance with the present invention has a handle (10) that is divided into a grip (14) to hold and operate the handsaw and a connecting block (15) to connect the saw blade (20) to the handle (10). The means of connecting of the saw blade (20) to the connecting block (15) is the same as the previously described embodiment of handsaw in accordance with the present invention.

Besides having all the features of the first embodiment of the handsaw, the second embodiment of the handsaw includes features to allow the saw blade (20) to be rotated along the longitudinal axis of the handsaw so the angle with respect to the grip (14) can be adjusted. The grip (14) has a front and a rear with a circular dividing plate (141) extending laterally from the front of the grip (14). The connecting block (15) has a front and a rear with the saw blade (20) pivotally connected to the front of the connecting block (15) and a disc (151) extending laterally from the rear of the connecting block (15). The dividing plate (141) has a radial scale (143) defined on the edge of the dividing plate (141), and the disc (151) has an index line (153) defined on the edge of the disc (151). The dividing plate (141) and the disc (151) abut each other. Two threaded studs (142) are mounted on diametrically opposite sides of the dividing plate (141) to extend from the dividing plate (141) and through the disc (151) on the connecting block (15). The disc (151) of the connecting block (15) includes two corresponding arcuate slots (152) defined to receive and allow the threaded studs (142) to move in the arcuate slots (152). Two nuts (154) are respectively screwed onto the threaded stud (142) to hold the grip (14) in place. The grip (14) can be rotated relative to the connecting block (15) to suit a special working condition when the two nuts (154) are released and the rotated degrees of the grip (124) can be read due to the dividing line (143) and the indicating line (153).

Although the invention has been explained in relation to its preferred embodiment, it is to be understood that many other possible modifications and variations can be made without departing from the spirit and scope of the invention as hereinafter claimed.

What is claimed is:

1. A handsaw comprising:
  a handle including:
    a slit defined in a front end of the handle and parallel to a left and a right side of the handle;
    an opening defined in a rear end of the handle for holding;
    a pivot hole defined in the front end of the handle, transversely extending through the handle and communicating with the slit in the handle; and
    a positioning hole defined between the opening and the pivot hole, transversely extending through the handle and communicating with the slit in the handle;
  a saw blade selectively pivotally connected to the handle and partially received in the slit in the handle, the saw blade having a front end and rear end and including:
    multiple indents defined in the rear end of the saw blade and corresponding to the positioning hole in the handle;
    multiple protrusions formed between adjacent indents; and
    a through hole defined in the saw blade and corresponding to the pivot hole in the handle; and a position device mounted in the handle to hold the saw blade in place, the position device including:
  a pivot pin mounted in the pivot hole in the handle to pivotally mount the saw blade in the handle; and
  a locking pin movably mounted in the positioning hole to engage the indent in the saw blade, the locking pin extending through the handle after penetrating a spring and having a locking element attached to a free end of the locking pin to prevent the locking pin from detaching from the handle.

2. The handsaw as claimed in claim 1, wherein:
the handle comprises:
  a first enlarged countersunk hole defined in a left side of the handle and communicating with the pivot hole of the handle; and
  a first polygonal recess defined in the handle between the first enlarged countersunk hole and the slit, the first polygonal recess communicating with the first enlarged countersunk hole and having an area smaller than that of the first enlarged countersunk hole; and
the pivot pin comprises:
  a head received in the first enlarged countersunk hole in the handle;
  a block extending from the head and received in the first polygonal recess to prevent the pivot pin from rotating in the pivot hole, the block being polygonal and corresponding to the first polygonal recess; and
  a rod extending from the block, the rod received in the pivot hole and extending through the handle, the rod having a threaded free end and a nut screwed onto the free end of the rod to prevent the pivot pin from detaching from the handle.

3. The handsaw as claimed in claim 2, wherein:
the handle comprises:
  a second enlarged countersunk hole defined in the left side of the handle and communicating with the positioning hole;
  a second polygonal recess defined in the handle between the second enlarged countersunk hole and the slit, the second polygonal recess communicating with the second enlarged countersunk hole and having an area smaller than that of the second enlarged countersunk hole; and
  a third enlarged countersunk hole defined in a right side of the handle and communicating with the positioning hole in the handle to receive the locking element in the third enlarged countersunk hole;
the locking pin comprises:
  a button received in the second enlarged countersunk hole in the handle;
  a position block extending from the button and received in the second polygonal recess, the position block being polygonal and engaged with the second polygonal recess to prevent the locking pin from rotating in the positioning hole;
  a channel defined in the position block to allow the protrusions of the saw blade to pass through when the button is pressed down;
  a position pin extending from the position block and received in the positioning hole to engage the indent in the saw blade, the position pin having a first end connecting to the position block and a second end extending to the third enlarged countersunk hole for the locking element to be attached to the position pin; and
  a guiding portion defined in the first end of the position pin and tapered off to the position block.

4. The handsaw as claimed in claim 3, wherein the locking element is an E-shaped ring.

5. The handsaw as claimed in claim 1, wherein:
the handle comprises:
  a first enlarged countersunk hole defined in the left side of the handle and communicating with the positioning hole;
  a first polygonal recess defined in the handle between the first enlarged countersunk hole and the slit, the first polygonal recess communicating with the first enlarged countersunk hole and having an area smaller than that of the first enlarged countersunk hole; and
  a second enlarged countersunk hole defined in a right side of the handle and communicating with the positioning hole in the handle to receive the locking element in the second enlarged countersunk hole;
the locking pin comprises:
  a button received in the first countersunk hole in the handle;
  a position block extending from the button and received in the first polygonal recess, the position block being polygonal and engaged to the first polygonal recess to prevent the locking pin from rotating in the positioning hole;
  a channel defined in the position block to allow the protrusions of the saw blade to pass through when the button is pressed down;
  a position pin extending from the position block and received in the positioning hole to engage the indent in the saw blade, the position pin having a first end connecting to the position block and a second end extending to the second enlarged countersunk hole for the locking element attached to the position pin; and
  a guiding portion defined in the first end of the position pin and tapered off to the position block.

6. The handsaw as claimed in claim 5, wherein the locking element is an E-shaped ring.

7. The handsaw as claimed in claim 1, wherein the locking element is an E-shaped ring.

* * * * *